United States Patent [19]

Uchiyama et al.

[11] Patent Number: 5,279,877
[45] Date of Patent: Jan. 18, 1994

[54] MAGNETO OPTICAL DISC

[75] Inventors: Ryota Uchiyama, Narita; Hiroyuki Endo; Isamu Kuribayashi, both of Saku; Shin-ichi Tezuka, Ichikawa; Tsuneo Kuwahara, Saku; Hideki Hirata, Kitasaku; Setsuko Shibuya, Saku, all of Japan

[73] Assignee: TDK Corporation, Tokyo, Japan

[21] Appl. No.: 935,114

[22] Filed: Aug. 27, 1992

[30] Foreign Application Priority Data

Sep. 6, 1991 [JP] Japan .................... 3-254597
Apr. 15, 1992 [JP] Japan .................... 4-121269

[51] Int. Cl.⁵ .................................. B32B 3/02
[52] U.S. Cl. .................................. 428/64; 428/65; 428/327; 428/421; 428/422; 428/694 NF; 428/694 TF; 428/694 BF; 369/283
[58] Field of Search ............. 428/64, 65, 327, 913, 428/695, 421, 422, 694; 346/76; 369/275.5, 283

[56] References Cited

U.S. PATENT DOCUMENTS

| | | | |
|---|---|---|---|
| 4,578,299 | 3/1986 | Kato et al. | 428/65 |
| 4,696,845 | 9/1987 | Yanagisawa | 428/64 |
| 4,721,640 | 1/1988 | Kato et al. | 428/65 |
| 4,985,289 | 1/1991 | Kamezaki et al. | 428/64 |
| 5,063,119 | 11/1991 | Ishida et al. | 428/694 |
| 5,069,967 | 12/1991 | Yokoyama et al. | 428/336 |
| 5,091,249 | 2/1992 | Nishikawa et al. | 428/336 |
| 5,161,150 | 11/1992 | Namba et al. | 369/275.4 |
| 5,176,943 | 1/1993 | Woo | 428/64 |

FOREIGN PATENT DOCUMENTS

| | | |
|---|---|---|
| 2-40149 | 2/1990 | Japan . |
| 2-301040 | 12/1990 | Japan . |
| 2-301041 | 12/1990 | Japan . |
| 3-17844 | 1/1991 | Japan . |
| 3-37844 | 2/1991 | Japan . |
| 3-62338 | 3/1991 | Japan . |

*Primary Examiner*—Patrick J. Ryan
*Assistant Examiner*—Marie R. Macholl
*Attorney, Agent, or Firm*—Watson, Cole, Grindle & Watson

[57] ABSTRACT

A protective coating made of resin, preferably a radiation curable resin containing fluoroplastic fine particles having a low surface energy is provided in the form of the uppermost layer facing a magnetic head, thereby improving the frictional properties and durability of a magneto-optical disc that is used with a magnetic field modulation system in which the magnetic head comes in constant contact therewith.

6 Claims, 1 Drawing Sheet

MAGNETO OPTICAL DISC

BACKGROUND OF THE INVENTION

TECHNICAL FIELD

The present invention relates to a magneto-optical disc with magnetic field modulation system.

BACKGROUND OF THE INVENTION

Optical discs as mass information carrier media are now attractive. Among these, there is a magneto-optical magnetic field modulation system that can be overwritten and so is expected to be applied to data files, etc. According to this magnetic field modulation procedure, the magnetic layer of a magneto-optical disc is irradiated with a laser beam from an optical pickup in a DC manner to increase its temperature and, at the same time, a modulated magnetic field is applied onto the magnetic layer through a magnetic head located on the side opposite to the optical pickup for overwriting recording.

So far, this recording has been mainly achieved by the CSS method in which the disc starts to rotate while in contact with the magnetic head and returns to the state of contact upon stopping. A magnetic head of the type that is constantly in contact with the disc has been proposed as well. For that reason, it is required for this type of magneto-optical disc that the surface protective film located on the magnetic head side be protected against adsorption and have some durability with respect to head crash, etc.

Various proposals have been made for such protective films. For instance, JP-A-2-301040 and JP-A-2-301041 (laid open for public inspection) propose the use of a resin composition composed mainly of a polyurethane type resin containing fluorine, and JP-A-3-37844 (laid open for public inspection) comes up with the use of a resin composition containing a fluoroplastic soluble in an organic solvent as the main component. It has also been proposed to incorporate in these resin compositions a metal element larger in ionization tendency than the transition metal element forming a recording film or an filler for lubrication.

In addition, JP-A-2-40149 (laid open for public inspection) proposes the incorporation of a lubricant in an ultraviolet curable resin, and JP-A-3-17844 (laid open for public inspection) uses a lubricant layer. JP-A-3-62338 (laid open for public inspection) makes a proposal to the effect that an overcoat layer is provided on its surface with uniform undulations of 0.1 $\mu$m to 0.5 $\mu$m inclusive.

However, these are all less than satisfactory. For instance, a smooth surface formed of resin alone is insufficient in terms of lubrication, and the incorporation of metals or fillers for lubrication, if they are hard, poses a problem that the associated head is damaged. The use of a lubricant is unpreferable as well in terms of disc properties.

DISCLOSURE OF THE INVENTION

An object of the invention is to provide a magneto-optical disc with a magnetic field modulation system that has sufficient frictional properties and excels in durability.

Such an object is achieved by the inventions (1) to (11) mentioned below.

(1) A magneto-optical disc with magnetic field modulation system including a recording layer on a substrate and a protective coating on the recording layer, wherein:
said protecting coating is a layer of a resin containing fine particles of a fluoroplastic.

(2) A magneto-optical disc as recited in (1), wherein the fluoroplastic forming said fine particles is a low-molecular-weight polytetrafluoroethylene.

(3) A magneto-optical disc as recited in (1), wherein said fluoroplastic has a surface energy of 40 erg/cm$^2$ or less.

(4) A magneto-optical disc as recited in (1), wherein said fine particles have an average particle diameter of 0.1 to 10 $\mu$m.

(5) A magneto-optical disc as recited in (1), wherein said protective coating contains 2 to 40% by weight of said fine particles.

(6) A magneto-optical disc as recited in (1), wherein said protective coating has a thickness of 1 to 30 $\mu$m.

(7) A magneto-optical disc as recited in (1), wherein said resin containing said fine particles is a radiation curable resin.

(8) A magneto-optical disc as recited in (1), wherein said protective coating further contains a fluorine containing a nonionic surfactant.

(9) A magneto-optical disc as recited in (8), wherein said nonionic surfactant has a basic structure that contains perfluoroalkyl and alkyl groups by way of at least one ethylene oxide group.

(10) A magneto-optical disc as recited in (8), wherein said nonionic surfactant contains a component having a molecular weight of 1,000 or higher.

(11) A magneto-optical disc as recited in (8), wherein the amount of said nonionic surfactant in said protective coating is 0.1 to 5% by weight.

ILLUSTRATIVE CONSTRUCTION

Figure 1:
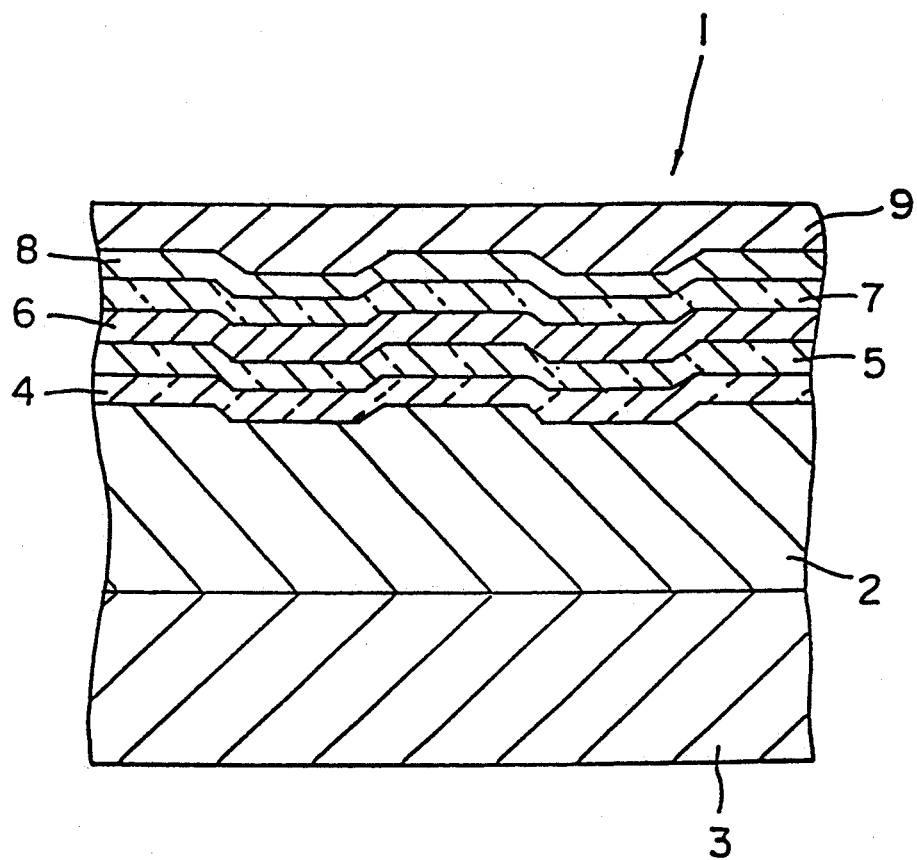
FIG. 1 is a partly sectioned view showing one example of the magneto-optical disc according to the invention.

In the ensuing description, the illustrative construction of the invention will be explained at great length. The magneto-optical disc of the invention, for instance, has such a structure as shown in FIG. 1. The invention will now be explained with reference to the magneto-optical disc shown in FIG. 1. A magneto-optical disc 1 shown in FIG. 1 includes on the surface of a substrate 2 a protective layer 4, an intermediate layer 5, a recording layer 6, a protective layer 7, a reflective, layer 8 and a protective coating 9 in the order mentioned. In this case, the surface of the disc or, in other words, the back surface of the substrate 2 may additionally be provided with a hard coating 3.

In this invention, the protective coating 9 is a resin layer containing fine particles of a fluoroplastic having a low surface energy. Preferably, the fluoroplastic has a surface energy of 40 erg/cm$^2$ or less, especially 25 erg/cm$^2$ in bulk. The surface energy was found from the critical surface tension calculated from the contact angles of various liquids with known surface tensions of a sample of about 2 cm and 2 cm in size and about 0.2 cm in thickness for example, or from adsorption experimentation using the saturated vapor of a liquid. The fluoroplastic has preferably a coefficient of friction of 0.3 or less in bulk, as found by testing methods for sliding wear resistance according to JIS K7218.

As the plastic having such physical properties, it is preferable to use a fluoroplastic which, when used in the form of fine particles, makes it possible to improve frictional properties and so attain the effect of the invention. It is noted that JP-A-3-62338 (laid-open for public inspection) discloses an overcoat layer (that is equivalent to the protective coating of the invention) containing an ultraviolet curable resin and fine particles (Tospearl 108 made by Toshiba Silicone K. K.) of 0.8 μm in diameter, which consists of a silicone resin and is used in an amount of 30% by weight with respect to the total weight of resin, and having a surface roughness of 0.2 μm. With such fine particles of the silicone resin, however, the effect of the invention is not achieved.

In the present invention, it is preferred that the fluoroplastic forming fine particles is a low-molecular-weight polytetrafluoroethylene represented by the following formula I:

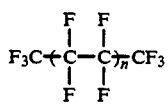

In Formula I, it is preferred that n is 5 to 2,000, esp., 8 to 500. This resin has an average molecular weight of 600 to 200,000, preferably 1,000 to 50,000, a melting point of 70° to 350° C., preferably 90° to 330° C. and a true specific gravity of 2.0 to 2.5, more preferably approximately 2.3.

The fine particles are not subject to any specific limitation in terms of shape, and may take various forms, e.g., spherical, flaky, bulky or bulk-fibrous forms. However, the most preference is given to spherical particles. As measured by electron microscope (SEM) photograph observation, the fine particles have an average particle diameter of 0.1 to 10 μm, more preferably 0.2 to 3 μm. At this time, some improvement in frictional properties is obtained.

It is preferred that the content of fine particles of fluroplastic with respect to the whole of the protective coating 9 is 2 to 40% by weight, more particularly 10 to 30% by weight. At this time, some improvement in frictional properties is obtained. Although it is usually preferable to disperse the fine particles of fluoroplastics uniformly throughout the protective coating 9, they may optionally be allowed to exist in its surface layer as by multi-layer coating, etc.

In the protective coating 9, it is preferable to incorporate the fine particles of the fluoroplastic in a radiation curable resin. More illustratively, it is preferable that the radiation curable resin is formed of a radiation-cured substance from a radiation curable composition for polymerization. Such a substance may be a monomer, oligomer or polymer having a group sensitive to ionization energy for radical polymerization and capable of being crosslinked or polymerized by exposure to radiation, incorporated or introduced in its molecule, for instance, acrylic or methacrylic acid having an unsaturated double bond, an ester compound thereof that has an acrylic double bond, a compound having an allyl type double bond such as diallyl phthalate, and a compound having an unsaturated double bond such as maleic acid or its derivative. These should preferably be polyfunctional, esp., tri- or more-functional, and may be used alone or in combination of two or more.

A compound having a molecular weight less than 2,000 is suitable for the radiation curable monomer, and a compound having a molecular weight of 2,000 to 10,000 is fit for the oligomer. Mentioned to this end, for instance, are styrene, ethyl acrylate, ethylene glycol diacrylate, ethylene glycol dimethacrylate, diethylene glycol diacrylate, diethylene glycol methacrylate, 1,6-hexane glycol diacrylate and 1,6-hexane glycol dimethacrylate. However, particular preference is given to pentaerythritol tetraacrylate (methacrylate), pentaerythritol acrylate (methacrylate), trimethylolpropane triacrylate (methacrylate), trimethylolpropane diacrylate (methacrylate), acrylic-modified urethane elastomers—all these compounds may have a functional group such as COOH introduced in them, acrylates (methacrylates) of phenol ethylene oxide adducts, compounds in which an acrylic (or methacrylic) group or an ε-caprolactone-acrylic group is attached to a pentaerythritol condensed ring, as set forth in JP-A-62-072888, and acrylic group-containing monomers and/or oligomers like special acrylates, as set forth in JP-A-62-072888. Besides, oligoester acrylates or acrylic-modified urethane elastomers, which may have a functional group such as COOH introduced in them, may be used as the radiation curable oligomers.

In addition to, or in place of, the compounds mentioned above, a radiation curable, compound obtained by modifying thermoplastic resin to be sensitive to radiation may be used as well. Illustrative examples of such radiation curable resins are a thermoplastic resin that has a group capable of being crosslinked or polymerized by the irradiation of radiations incorporated or introduced in its molecule, said group including an unsaturated double bond showing radical polymerizability such as an acrylic double bond like that of acrylic or methacrylic acid or its ester, an allylic double bond like that of diallyl phthalate and an unsaturated double bond like that of maleic acid or its derivative. Examples of the thermoplastic resin that can be modified into a radiation curable resin include a vinyl chloride type of copolymer, saturated polyester resin, a polyvinyl alcohol type of resin, an epoxy type of resin, a phenoxy type of resin and a cellulosic derivative. To add to this, as resins that can be modified to be sensitive to radiation, it is possible to effectively use polyfunctional polyester resin, polyether ester resin, polyvinyl pyrrolidone resin and its derivatives (PVP/olefin copolymers), polyamide resin, polyimide resin, phenolic resin, spiro-acetal resin and acrylic resin containing at least one of acrylates and methacrylate containing a hydroxyl group as a polymerizing component.

The coating composition for polymerization should preferably contain a photopolymerization initiator or sensitizer, because it is cured by exposure to radiation, esp., ultraviolet rays. No particular limitation is placed on the photopolymerization initiator or sensitizer used, and so ordinary agents such as those based on acetophenone, benzoin, benzophenone and thioxantone may selectively be used. It is noted that a plurality of compounds may be used at the same time as the photopolymerization initiator or sensitizer. Usually, the content of the photopolymerization initiator in the composition for polymerization may be of the order of 0.5 to 5% by weight. Such a composition for polymerization may either be synthesized conventionally or be prepared with the use of commercially available compounds.

For the composition containing a radiation curable compound to form the protective coating 9, a composition containing epoxy resin and a catalyst for photo-cationic polymerization is suitably used as well. As the epoxy resin, preference is given to an alicyclic one and particular preference to one containing two or more epoxy groups in its molecule.

As the alicyclic epoxy resins, for instance, it is preferable to use at least one of 3,4-epoxycyclohexyl-methyl-3,4-epoxycyclohexane carboxylate, bis-(3,4-epoxycyclohexylmethyl)adipate, bis-(3,4-epoxycyclohexyl)adipate, 2-(3,4-epoxycyclohexyl-5,5-spiro-3,4-epoxy)cyclohexane-metadioxane, bis-(2,3-epoxycyclopentyl)ether and vinylcyclohexenedioxide. The epoxy equivalent of the alicyclic epoxy resin, although not subject to some particular limitation, is preferably 60 to 300, esp., 100 to 200, because sufficient curing characteristics are then obtained.

All known catalysts for photo-cationic polymerization may be used without any particular limitation. For instance, use may be made of complexes of at least one of metal fluoroborates and boron trifluoride, metal salts of bis-(perfluoroalkylsulfonyl)methane, aryl diazonium compounds, aromatic onium salts of 6A-group elements, aromatic onium salts of 5A-group elements, dicarboxylates of 3A to 5A-group elements, thiopyrylium salts, 6A-group elements containing $MF_6$ anions (note that M is P, As or Sb), triaryl sulfonium salts, aromatic iodonium complex salts and aromatic sulfonium complex salts. Particular preference is given to using at least one of polyaryl sulfonium complex salts, halogen-containing aromatic sulfonium or iodonium salts containing complex ions and aromatic onium salts of 3A, 5A and 6A-group elements.

Catalysts for photo-cationic polymerization that contain an organic metal compound and a photo-decomposable organosilicon compound may be used as well. With such catalysts for photo-cationic polymerization that are of a non-strong acid type, it is possible to ward off any adverse influence on the recording layer—likely to corrode—of the magneto-optical recording disc. As the organic metal compounds, it is preferable to use complex compounds in which alkoxy, phenoxy, $\beta$-diketonato and other groups are attached to such metal atoms as Ti, V, Cr, Mn, Fe, Co, Ni, Cu, Zn, Al and Zr. Among these, organoaluminum compounds are particularly preferable. More illustratively, trismethoxyaluminum, trispropionatoaluminum, trisfluoroacetylaluminum and trisethylacetoacetonatoaluminum are preferable.

The photo-decomposable organosilicon compounds, which form silanol upon exposure to light such as ultraviolet rays, are preferably silicon compounds containing peroxysilano, o-nitrobenzyl, $\alpha$-ketosilyl and other groups.

Preferably, the content of the photo-cationic polymerization catalyst in the composition is 0.05 to 0.7 parts by weight, esp., 0.1 to 0.5 parts by weight per 100 parts by weight of the epoxy resin.

Among others, it is preferable to use a compound containing an acrylic group as the radiation curable compound and cure a coating containing a photopolymerization sensitizer or initiator with radiation, esp., ultraviolet rays.

In the present invention, it is preferred that the protective coating 9 contains a nonionic surfactant in addition to the fine particles of the fluoroplastic and the resin. This enables the coating to be well applied with some improvement in the surface properties thereof after drying. Even used repeatedly, this coat is unlikely to undergo any degradation of its frictional properties, and so has very high frictional durability.

Preferably, the nonionic surfactant is of a fluorine containing and, more preferably, it has a basic structure containing a perfluoroalkyl group and an alkyl group at both its ends by way of at least one ethylene oxide group. The use of the fine particles of the fluoroplastic and the fluorine containing nonionic surfactant makes it possible to improve frictional properties and durability even more considerably, so that the coating can be even more considerably improved in terms of what state it is coated in and surface properties. In this connection, it is noted that the term "frictional durability" refers to an index to what changes occur in the frictional properties of the magneto-optical recording disc, after repeating contact durability testing in which it runs in contact with the magnetic head. Such an effect increases synergistically by the combined use of both.

The fluorine containing nonionic surfactant in the present invention contains an ethylene oxide group as the hydrophilic group and an alkyl group as the lipophilic group, and should preferably be one represented by the following formula II and a compound that contains it in its basic structure and is derived from it, such as an oligomer:

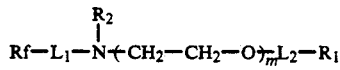

In Formula II, Rf stands for a perfluoroalkyl group having 4 to 12, preferably 6 to 10, carbon atoms. $L_1$ denotes a sulfonyl or carbonyl group, preferably a sulfonyl group, and $L_2$ indicates a carbonyl or carbonyloxy group. $R_1$ stands for a hydrogen atom or an alkyl group which may or may not have a substitutent, and the alkyl group, if not substituted, is preferably one having 1 to 6 carbon atoms, for instance, a butyl or pentyl group. The alkyl group, if substituted, is preferably replaced by an alkyl, aryl or other like group. $R_2$ denotes an alkyl group that has preferably 1 to 5 carbon atoms, for instance, a methyl, ethyl or propyl group. m stands for a positive integer of 1 to 20.

As one of the compounds represented by Formula II, it is also preferable to use a compound which has the following formula III and in which R 1 and L 2 form together a polymethyl methacrylate (PMMA) skeleton so as to be made polymeric:

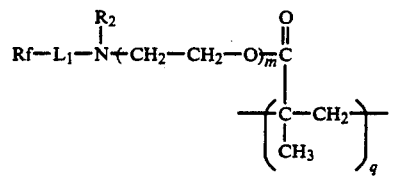

In Formula III, Rf, $L_1$, $R_2$ and m have the same meanings as defined in connection with Formula II, and q stands for a positive integer of 2 to 20.

The nonionic surfactant used in the present invention contains a component having a molecular weight of at least 1,000, preferably 2,000 to 20,000. It is then preferable that the component forming a major part of molecular weight accounts for at least about 50%, specifically about 50% to 100% of the total amount of the surfactant. The effect of the invention on frictional durability, etc., is improved by using a surfactant having such a molecular weight or molecular weight distribution.

The surfactant used in the present invention may be some commercial product that consists solely of one of the basic structures represented by Formula II or is a mixture thereof, for instance, F-177 and F-172 (made by Dainippon Ink & Chemicals, Inc.).

The content of such a surfactant relative to the total weight of the protective coating 9 is preferably 0.1 to 5% by weight, more particularly 0.5 to 3% by weight. Such a content serves well to improve the effect of the invention on frictional durability, etc.

In the present invention, it is preferable to use such a surfactant alone but, when occasion demands, another surfactant may be used in addition to the surfactant according to the invention. In order to secure the effect of the invention, it is then preferable to use the surfactant according to the invention in an amount of 60% by weight or more.

For instance, the protective coating 9 may be formed in the following manner: First, the composition of such a resin, preferably, radiation curable resin is mixed with the above-mentioned fine resin particles and, if required, a given amount of the surfactant as by ball mill or ultrasonic dispersion, and a coating of the resultant mixture is formed on the reflective layer 8. No particular limitation is placed on how the coating is formed; that is, the coating may be formed by some combination of known procedures such as spin coating, gravure coating, spray coating and dipping. The coating conditions applied may optionally be determined while taking into consideration the viscosity of the composition for polymerization, the end coating thickness and other factors.

Then, the coating is irradiated with ultraviolet rays for curing. It is noted that when occasion demands, the irradiation of ultraviolet rays may be carried out after heating, or alternatively electron beams may be used instead of ultraviolet rays for irradiation. The ultraviolet rays applied to the coating are usually of about 50 mW/cm$^2$ or more in intensity and ordinarily of about 500 to 2,000 mJ/cm$^2$ in dosage. As the ultraviolet source, use may be made of an ordinary one such as a mercury lamp. Upon exposure to ultraviolet rays, the compounds mentioned above are radically polymerized.

The thus obtained protective coating 9 may have a thickness of 1 to 30 $\mu$m, preferably 2 to 20 $\mu$m. At such a thickness the effect of the invention is improved. Too thin a coating makes it difficult to form a uniform film, failing to provide sufficient durability. Too thick a coating, on the other hand, causes the film to crack due to contraction during curing or make the disc likely to warp.

The protective coating 9 has a surface roughness of about 50 to 1,000 nm, preferably about 100 to 500 nm (as measured at a length of 0.5 mm), as expressed in terms of Ra according to the definition of JISB0601, and a coefficient of dynamic friction of about 0.05 to 0.10 as well.

The substrate 2 in the present invention may be made up of any desired material that is transparent, for instance, glass or various transparent plastics. Usable as the transparent resins are polycarbonate resin, acrylic resin, amorphous polyolefine resin, styrene type resin and the like.

As can be seen from FIG. 1, the substrate 2 is provided with a transparent hard coating 3 on its back side. The hard coating 3 may again be made of a radiation curable resin material similar to the preferable resin forming the protective coating 9 mentioned above. Preferably, the hard coating 3 is of 1 to 30 $\mu$m, particularly 3 to 10 $\mu$m in thickness. Preferably, the transmittance of the substrate 2 with such a hard coating 3 applied on it with respect to recording and reproducing beam light is at least 80%, particularly at least 85%. Hard coats may be applied not only on the major surface of the disc but on the outer and inner peripheries thereof as well. It is understood that the surface of the substrate 2—on which the recording layer 6 is formed—is provided with tracking grooves.

In the magneto-optical recording disc shown in FIG. 1, the substrate 2 is provided thereon with the recording layer 6 through the protective and intermediate layers 4 and 5 that serve as under layers. The intermediate layer 5 is provided to increase the C/N ratio, is preferably formed from a variety of dielectric materials, and is again preferably about 30 to 150 nm in thickness.

Another protective layer 7 may be formed along with the protective layer 4 on the recording layer 6. When used in combination, both the protective layers 4 and 7 may be identical with, or different from, each other in composition. The protective layers 4 and 7—which are provided if required—are provided so as to enhance the corrosion resistance of the recording layer 6, and at least one of them is provided, but it is preferable to provide them simultaneously. These protective layers are each constructed from an inorganic thin film comprising a variety of oxides, carbides, nitrides and sulfides or a mixture thereof. In view of improving corrosion resistance, the protective layers have preferably a thickness of about 30 to 300 nm. Such protective layers 4,7 and the intermediate layer 5 are preferably formed by various gas-phase film forming techniques such as sputtering, vapor deposition and ion plating, esp., sputtering.

Information is magnetically recorded on the recording layer 6 by modulated heat beams or a modulated magnetic field, and the thus recorded information is reproduced by magneto to optoconversion. The recording layer 6 may be made up of any desired material that can be used for magneto-optical recording. However, it is preferably made up of an amorphous film formed by subjecting an alloy containing rare earth metal elements, esp., an alloy of a rare earth metal with a transition metal to sputtering, vapor deposition and ion plating, especially to sputtering. As the rare earth metals it is preferable to use at least one of Tb, Dy, Nd, Gd, Sm and Ce, and as the transition metals it is preferable to use Fe and Co. In this case, the total content of Fe and Co is preferably 65 to 85 at. % with the balance being substantially rare earth metals.

A preferably used recording layer has a composition such as TbFeCo, DyTbFeCo, NdDyFeCo and NdGdFeCo. It is noted that the recording layer may additionally contain Cr, Al, Ti, Pt, Si, Mo, Mn, V, Ni, Cu, Zn, Ge, Au and the like in a range up to 10 at. %. Other rare earth metal elements such as Sc, Y, La, Ce, Pr, Pm, Sm, Eu, Ho, Er, Tm, Yb and Lu may be incorporated in the recording layer as well, again in a range of 10 at. % or less. Usually, such a recording layer 6 is of the order of 10 to 1,000 nm in thickness. Then, the protective layer 7 is provided thereon with the metallic reflective layer 8. Materials forming the reflective layer 8 may be such metals as Au, Ag, Pt, Al, Ti, Cr, Ni and Co or alloys or compounds thereof. The reflective layer 8 may be provided much in the same manner as in the case of the recording layer 6, and has a thickness of 30 to 200 nm.

EXAMPLES

In the ensuing description, the invention will be explained more specifically with reference to some illustrative examples.

EXAMPLE 1

A polycarbonate resin substrate of 86 mm in outer diameter, 15 mm in inner diameter and 1.2 mm in thickness was provided with a coating of the composition for forming a hard coating layer on the side opposite to the side on which a recording layer was to be formed and on the peripheral surface as well. This coating was cured with ultraviolet rays to form a hard coating. The hard coating was obtained by applying the following composition (A) for polymerization by means of spin coating and curing it by exposure to ultraviolet rays, and was found to have an average thickness of 5 μm after curing.

| Composition (A) for Polymerization | |
|---|---|
| Oligoester acrylate (with a molecular weight of 5,000) | 50 parts by weight |
| Trimethylolpropane triacrylate | 50 parts by weight |
| Acetophenone type photopolymerization initiator | 3 parts by weight |

Then, a protective layer of glass was provided in a layer thickness of 40 nm on a certain region of the other surface of the substrate having the hard coating formed thereon, using radio-frequency magnetron sputtering. On this protective layer there was provided an intermediate layer of $SiN_x$ in a layer thickness of 80 nm by means of radio-frequency magnetron sputtering. Then, on this intermediate layer there was provided a recording layer composed of $Tb_{23}Fe_{72}Co_5$ in a layer thickness of 20 nm by means of sputtering.

Further, another protective layer having the same composition as the protective layer mentioned above was provided on the recording layer in a layer thickness of 20 nm by means of radio-frequency magnetron sputtering, and this protective layer was provided thereon with an 80-nm Al alloy reflective layer, on which a protective coating was provided.

The protective coating was obtained by forming a coating of such a composition (1) for polymerization as mentioned below and irradiating it with ultraviolet rays for curing, and was found to have an average thickness of 5 μm after curing. The ultraviolet rays were applied at a dosage of 1,000 mJ/cm².

| Composition (1) for Polymerization | |
|---|---|
| Oligoester acrylate (with a molecular weight of 5,000) | 50 parts by weight |
| Trimethylolpropane triacrylate | 50 parts by weight |
| Acetophenone type polymerization initiator | 3 parts by weight |
| fluoroplastic fine particles A (represented by Formula I; n = 10 − 15; average molecular weight = 1100 − 1600; melting point = 200° C.; true specific gravity = 2.3; and average particle diameter = 1.0 μm) | 20 parts by weight |

This was used as Sample No. 1. It is noted that the fluoroplastic forming the fine particles is found to have a surface energy of 20 erg/cm² in bulk, as measured by the procedure under the conditions—set forth hereinbefore. As measured according to JISK7218, the coefficient of friction was 0.3 or less in bulk.

The procedures for preparing the protective coating of Sample No. 1 were substantially followed with the exception that according to JP-A-3-62338 (laid open for public inspection), fine particles of silicone resin (Tospearl 108 made by Toshiba Silicone K. K. with a particle diameter of 0.8 μm) were used instead of the fluoroplastic fine particles, thereby preparing Sample No. 2.

In addition, the procedures for preparing the protective coating of Sample No. 1 were substantially followed with the exception that the fluoroplastic fine particles were not used, thereby preparing Sample No. 3.

Moreover, the procedures for preparing the protective coating of Sample No. 1 were substantially followed with the exception that TEFLON-sol with a average particle diameter of 0.25 μm=fine resin particles B represented by Formula I; an average molecular weight of about 5,000; a melting point of 300° C.; and a true specific gravity of 2.3=were used in place of the fluoroplastic fine particles A, and the content of such fine resin particles B was regulated to 15 parts by weight with the use of the composition (1) for polymerization, thereby preparing Sample No. 4. It is noted that the surface energy and coefficient of friction of TEFLON forming the fine particles were almost identical with those of the fluoroplastic of Sample No. 1.

With (Mn-Zn ferrite) composite heads, the above-mentioned Sample No. 1 to No. 4 were tested in the following manners.

(1) Coefficient of Dynamic Friction, μ

Using a 3.5" magnetic disk drive made by Plus Co., Ltd., the disc was rotated at 1 rpm to find the stress applied on the head, from which μ was calculated. The load applied was 15 g.

(2) CSS Characteristics

Using a 3.5" magnetic disk drive made by Plus Co., Ltd., the number of CSS passes was found, when the coefficient of friction of the disc at a location spaced 22 mm away from its center exceeded 1.0 or the surface of the disc or head was damaged. It is noted, however, that one CSS pass is defined as a cycle of a stationary time of 10 seconds→a rise time of 5 second→a normal rotation time of 10 seconds→a fall time of 30 seconds and the disc is rotated at 3,600 rpm in a normal state. It is understood that the number of passes was found at 20° C. and 50% RH.

(3) Surface State of Head

After measuring the coefficient of dynamic friction, μ, at (1), the head's surface was observed under an optical microscope.

The results are set out in Table 1.

TABLE 1

| Sample No. | Protecting coat | μ | CSS characteristic (pass number) | Heads' surface state |
|---|---|---|---|---|
| 1 (Invention) | Acrylate + Fluoroplastic fine particles | 0.08 | >10⁵ | normal |

TABLE 1-continued

| Sample No. | Protecting coat | μ | CSS characteristic (pass number) | Heads' surface state |
|---|---|---|---|---|
| 2 (Comparison) | Acrylate + Tospearl | 0.20 | 5 (Head damaged) | damaged |
| 3 (Comparison) | Acrylate | Not measured due to adsorption | Not used for testing | — |
| 4 (Invention) | Acrylate + Fluoroplastic fine particles | 0.10 | $>10^5$ | normal |

EXAMPLE 2

A polycarbonate resin substrate of 86 mm in outer diameter, 15 mm in inner diameter and 1.2 mm in thickness was provided with a coating of the composition for forming a hard coating layer on the side opposite to the side on which a recording layer was to be formed and on the peripheral surface as well. This coating was cured with ultraviolet rays to form a hard coating. The hard coating was obtained by applying the following composition (A) for polymerization by means of spin coating and irradiating it with ultraviolet rays for curing, and was found to have a mean thickness of 5 μm after curing.

| Composition (A) for Polymerization | |
|---|---|
| Oligoester acrylate (with a molecular weight of 5,000) | 50 parts by weight |
| Trimethylolpropane triacrylate | 50 parts by weight |
| Acetophenone type photopolymerization initiator | 3 parts by weight |

Then, a protective layer of glass was provided in a layer thickness of 40 nm on a certain region of the other surface of the substrate having the hard coating formed thereon, using radio-frequency magnetron sputtering. On this protective layer there was provided an intermediate layer of $SiN_x$ in a layer thickness of 80 nm by means of radio-frequency magnetron sputtering. Then, on this intermediate layer there was provided a recording layer composed of $Tb_{23}FE_{72}Co_5$ in a layer thickness of 20 nm by means of sputtering.

Further, another protective layer having the same composition as the protective layer mentioned above was provided on the recording layer in a layer thickness of 20 nm by means of radio-frequency magnetron sputtering, and this protective layer was provided thereon with an 80-nm Al alloy reflective layer, on which a protective coating was provided.

The protective coating was obtained by mixing a composition (2) for polymerization containing fine resin particles B, as mentioned below, by means of an ultrasonic dispersing unit to obtain a coating and irradiating it with ultraviolet rays for curing, and was found to have a means thickness of 56 μm after curing. The ultraviolet rays were applied at a dose of 1,000 mJ/cm².

| Composition (2) for Polymerization | |
|---|---|
| Oligoester acrylate (with a molecular weight of 5,000) | 50 parts by weight |
| Trimethylolpropane triacrylate | 50 parts by weight |
| Acetophenone type polymerization initiator | 3 parts by weight |
| TEFLON-sol [fine resin particles B represented by Formula I; n = 50; an average molcular weight of about 5,000; a melting point of 300° C.; a true specific gravity of 2.3; an average particle diameter of 0.25 μm; and a solid matter content of 20% by weight] | 40 parts by weight |
| Fluorine containing nonionic surfactant [F-177 made by Dainippon Ink & Chemicals, Inc.; an oligomer type; and a major molecular weight of the component being 14000 (about 50% of the total amount)] | 1 part by weight |

This was used as Sample No. 11.

The procedures for preparing Sample No. 11 were substantially followed with the exception that the fluorine containing surfactant was changed to a surfactant of the type that, as represented by Formula III, contains an ethylene oxide group but no alkyl group [F-142D made by Dainippon Ink & Chemicals, Inc. and in Formula IV $R=C_3H_7$ and $p=10$], thereby obtaining Sample No. 12. As in the case of Sample No. 11, Sample No. 13 was obtained, but no fluorine containing surfactant was used.

where R stands for a hydrogen atom or a lower alkyl group and m denotes an integer of 10-20.

The above-mentioned Sample No. 11-No. 13 were measured in terms of Ra conforming to the definition of JIS B 0601 (at a length of 0.5 mm). After spin coating, the coatings were visually observed in terms of what conditions they were applied in.

In addition, the following tests were made with the use of (Mn-Zn ferrite) composite heads.

(1) Coefficient of Dynamic Friction, $\mu_1$.

Using a 3.5" magnetic disk drive made by Plus Co., Ltd., the disc was rotated at 1 rpm to find the stress applied on the head, from which μ, was calculated. The stress applied was 15 g.

(2) Contact Durability Testing

Using a 3.5" magnetic disk drive, the disc was rotated at 1.4 m/s while in contact with the head to find $\mu_1$ after 200,000 passes for test of the frictional durability.

The results are set out in Table 2.

TABLE 2

| sample No. | Surfactant | Coated State | Ra (nm) | Initial $\mu_1$ | After testing |
|---|---|---|---|---|---|
| 11 | F-177 | good | 200 | 0.10 | 0.15 |
| 12* | F-142D | somewhat rough | 700 | 0.10 | 0.30 |
| 13* | — | rough | 800 | 0.10 | 0.35 |

*After contact durability testing with Sample Nos. 12 and 13, something was deposited onto the heads.

As can be clearly understood from Table 2, Sample No. 11 is better than Sample Nos. 12 and 13 in terms of what conditions they were applied in and surface properties. The initial $\mu_1$ of Sample No 11 is small, indicating that $\mu_1$ is in good condition after running in contact with the head.

Moreover, the procedures for preparing Sample No. 11 were followed with the exception that the fluorine containing nonionic surfactant was replaced by 3 parts by weight of a similar F-172 (made by Dainippon Ink & Chemicals, Inc.; an oligomer type and a major molecular weight of the component being 5,000 (about 50% of the whole)), thereby obtaining Sample No. 14 that was found to be as excellent in properties as Sample No. 11.

EFFECT

The magneto-optical disc of the invention is excellent in frictional properties and frictional durability.

We claim:

1. A magnetic field modulation type of magneto-optical disc, comprising:
   a substrate;
   a recording layer formed on said substrate;
   a protecting coating formed on said recording layer; and
   said protecting coating is a layer of a resin containing fine particles of polytetrafluoroethylene having a molecular weight of 600 to 200,000, said protecting coating having a thickness of 1 to 30 μm and further including a fluorine-containing nonionic surfactant in accordance with the following formula:

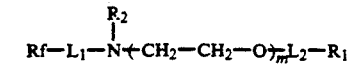

wherein:
Rf designates a perfluoroalkyl group having 4 to 12 carbon atoms; $L_1$ denotes a sulfonyl group; $L_2$ denotes a carbonyl or carbonyloxy group; $R_1$ denotes a hydrogen atom or an alkyl group; $R_2$ denotes an alkyl group; and m denotes a positive integer of 1 to 20.

2. A magneto-optical disc as recited in claim 1, wherein said fine particles have a mean particle diameter of 0.1 to 10 μm.

3. A magneto-optical disc as recited in claim 1, wherein said protecting coating contains 2 to 40% by weight of said fine particles.

4. A magneto-optical disc as recited in claim 1, wherein said resin containing said fine particles is a radiation curing resin.

5. A magneto-optical disc as recited in claim 1, wherein said nonionic surfactant contains a component having a molecular weight of substantially no greater than 20,000.

6. A magneto-optical disc as recited in claim 1, wherein the amount of said nonionic surfactant in said protecting coating is 0.1 to 5% by weight.

* * * * *